US012385311B2

(12) United States Patent
Wei

(10) Patent No.: US 12,385,311 B2

(45) Date of Patent: Aug. 12, 2025

(54) BI-DIRECTIONAL DAMPER FOR SHOWER DOOR

(71) Applicant: Foshan Ideal Co., Ltd., Foshan (CN)

(72) Inventor: Wuxiang Wei, Foshan (CN)

(73) Assignee: Foshan Ideal Co., Ltd., Foshan (CN)

( * ) Notice: Subject to any disclaimer, the term of this patent is extended or adjusted under 35 U.S.C. 154(b) by 0 days.

(21) Appl. No.: 18/281,271

(22) PCT Filed: Mar. 12, 2021

(86) PCT No.: PCT/CN2021/080346
§ 371 (c)(1),
(2) Date: Sep. 8, 2023

(87) PCT Pub. No.: WO2022/188121
PCT Pub. Date: Sep. 15, 2022

(65) Prior Publication Data

US 2025/0084688 A1 Mar. 13, 2025

(51) Int. Cl.
*E05F 5/02* (2006.01)
*E05F 5/00* (2017.01)
*E05F 5/10* (2006.01)

(52) U.S. Cl.
CPC ................ *E05F 5/10* (2013.01); *E05F 5/003* (2013.01); *E05Y 2201/212* (2013.01);
(Continued)

(58) Field of Classification Search
CPC ..... E05F 5/003; E05F 5/05; E05F 1/08; E05F 1/1091; E05F 1/16; E05F 3/00;
(Continued)

(56) References Cited

U.S. PATENT DOCUMENTS

| | | | | |
|---|---|---|---|---|
| 8,402,606 B1 * | 3/2013 | Tsai | E05F 5/003 16/49 |
| 11,162,289 B2 * | 11/2021 | Wei | E05F 1/16 |
| 2011/0252596 A1 | 10/2011 | Vogler | |
| 2013/0104339 A1 * | 5/2013 | Shimizu | E05F 1/16 16/72 |
| 2017/0051548 A1 * | 2/2017 | Wang | E05F 5/027 |
| 2021/0010309 A1 * | 1/2021 | Montecchio | E05D 15/0652 |

FOREIGN PATENT DOCUMENTS

| | | |
|---|---|---|
| CN | 104314407 | 1/2015 |
| CN | 204126451 | 1/2015 |

(Continued)

OTHER PUBLICATIONS

Chinese Office Action dated May 5, 2023 in Chinese Patent Application No. 202180000584.

(Continued)

*Primary Examiner* — Chuck Y Mah
(74) *Attorney, Agent, or Firm* — Snell & Wilmer L.L.P.

(57) ABSTRACT

Disclosed in the present invention is a bidirectional damper for a shower door, comprising a mounting frame, a tension spring, a damping cylinder, a first coupling member, a second coupling member and two clamping members. The cylinder body of the damping cylinder is a dual-cavity cylinder body; the two cylinder cavities of the dual-cavity cylinder body are arranged in parallel; the axes of the two cylinder cavities are parallel to each other, and the directions of cavity openings are opposite; the two cylinder cavities respectively correspond to a first piston rod and a second piston rod; the first piston rod and the second piston rod are parallel to each other; or the damping cylinder is formed by two separate parallel cylinder bodies arranged side by side with heads being adjacent to tails; the two cylinder bodies respectively correspond to the first piston rod and the second piston rod; the first piston rod and the second piston rod are parallel to each other.

3 Claims, 8 Drawing Sheets

(52) U.S. Cl.
CPC ..... *E05Y 2201/47* (2013.01); *E05Y 2600/502* (2013.01); *E05Y 2900/114* (2013.01)

(58) Field of Classification Search
CPC ....... E05F 3/02; E05F 3/04; E05F 3/18; E05F 3/227; E05F 3/22; E05F 3/10; E05F 3/108; E05F 3/224; E05F 5/10; E05F 5/02; E05Y 2800/24; E05Y 2800/21; E05Y 2201/64; E05Y 2201/644; E05Y 2201/264; E05Y 2201/41; E05Y 2201/412; E05Y 2201/47; E05Y 2201/21; E05Y 2201/212; E05Y 2201/488; E05Y 2900/132; E05Y 2900/142; E05Y 2900/14; E05Y 2900/114; E05Y 2201/232; E05Y 2201/426; E05Y 2201/638; E05Y 2201/688; E05Y 2800/11; Y10T 16/27; Y10T 16/56; Y10T 16/61; Y10T 16/593; Y10T 16/276; Y10T 16/281; Y10T 16/379; E05D 15/00; E05D 15/06; E05D 15/12; A47B 88/047; A47B 88/12; A47B 88/14; A47B 88/483; A47B 2210/0091; F16C 2314/72; F16C 29/002; F16C 41/001
See application file for complete search history.

(56) References Cited

FOREIGN PATENT DOCUMENTS

| | | | | | |
|---|---|---|---|---|---|
| CN | 104340512 | | | 2/2015 | |
| CN | 110520589 | | | 11/2019 | |
| DE | 102008051360 | A1 | * | 5/2010 | ........... A47B 88/467 |
| DE | 102013114309 | A1 | * | 6/2015 | ................ E05F 1/16 |
| DE | 202017100244 | U1 | * | 3/2017 | ............... A47K 3/34 |
| JP | 2008163704 | A | * | 7/2008 | ................ E05F 1/16 |
| JP | 2008285934 | A | * | 11/2008 | ................ E05F 1/16 |
| JP | 3147428 | | | 12/2008 | |
| JP | 2020084545 | A | * | 6/2020 | |
| WO | WO-2010043334 | A1 | * | 4/2010 | ........... A47B 88/467 |

OTHER PUBLICATIONS

International Search Report dated Dec. 2, 2021 in PCT International Application No. PCT/CN2021/080346.
Extended European Search Report Corresponding to Application No. 21929599.5, mailed Jul. 23, 2024.
First Office Action issued in corresponding Canadian Application No. 3,210,254 dated Dec. 30, 2024.
First Office Action issued in corresponding Australian Application No. 2021431976 dated May 6, 2024.

* cited by examiner

BI-DIRECTIONAL DAMPER FOR SHOWER DOOR

CROSS REFERENCE TO RELATED APPLICATIONS

This application is a U.S. national stage entry under 35 U.S.C. § 371 of International Application No. PCT/CN2021/080346 filed Mar. 12, 2021 entitled "BI-DIRECTIONAL DAMPER FOR SHOWER DOOR". The foregoing application is hereby incorporated by reference in its entirety for all purposes.

FIELD

The present application relates to the technical field of sanitary appliances, and in particular to an automatic buffer door opening and closing damper mounted on a shower door with a small width.

BACKGROUND

In an existing sliding opening-closing shower door, in order to reduce the collision between a movable door panel and a door frame and the resulting noise, a damper is generally mounted on a track of the shower door to provide buffer for the movement of the movable door panel. Furthermore, in order to effectively buffer the movable door panel in two directions of opening and closing the door, in the conventional technology, two dampers are mounted on the shower door track, and the two dampers respectively provide buffer for the movement of the movable door panel in the two directions of opening and closing the door. Since the mounting of dampers needs to occupy a certain space, it is necessary to increase the size of the track to place dampers when two dampers are used, which may lead to an increase in a structural size of the track, and also increase the cost of the shower door. In addition, the damping cylinders of the existing bidirectional damper are connected in series in the axial direction, so that the damper has a large size in the length direction, and a shower door with a small width is too small to install such a bidirectional damper, thus affecting the use effect of the shower door.

SUMMARY OF THE PRESENT APPLICATION

Technical Issues

The technical issue to be solved by the present application is to provide a bidirectional damper suitable for being mounted on a shower door with a small width.

Solutions to the Issues

Technical Solutions

To solve the above technical issues, a bidirectional damper for a shower door is provided according to the present application, including a mounting frame, a tension spring, a damping cylinder, a first coupling member, a second coupling member and two clamping members.

The mounting frame includes a first frame plate and a second frame plate with opposite main surfaces, where the first frame plate and the second frame plate are connected by a connecting plate and two fixing blocks, the first frame plate, the second frame plate and the connecting plate all have strip plate bodies extending along a length direction of the mounting frame, the first frame plate and the second frame plate are spaced apart along a width direction of the mounting frame and are parallel to each other, the two fixing blocks are positioned at two ends of the mounting frame in the length direction, the connecting plate includes a substantially horizontal main body section and two extension sections, and the two extension sections are connected to two ends of the main body section in a length direction thereof.

The first frame plate, the second frame plate and the two fixing blocks define a mounting cavity, the connecting plate divides the mounting cavity into an upper cavity and a lower cavity, the upper cavity is located above the connecting plate, the lower cavity is located below the connecting plate, and a cylinder body of the damping cylinder is fixed in the upper cavity.

The connecting plate is provided with two guide grooves extending through the two extension sections respectively, the two guide grooves extend along the length direction of the mounting frame on the extension sections, the two clamping members are respectively corresponding to the two guide grooves, and the respective clamping member is slidably mounted in the corresponding guide groove.

An outer end of each of the two extension sections is bent downwards to form a vertical positioning plate, each guide groove extends from the center of the corresponding vertical positioning plate to the main body section, a first cover plate and a second cover plate are respectively provided at two ends of the main body section, the damping cylinder is placed in the space defined by the first cover plate and the second cover plate, and is located in the middle of the upper cavity.

The cylinder body of the damping cylinder is a dual-cavity cylinder body, and two cylinder cavities of the dual-cavity cylinder body are arranged in parallel, the axes of the two cylinder cavities are parallel to each other, while the openings of the cylinder cavities face toward opposite directions, the two cylinder cavities correspond to a first piston rod and a second piston rod respectively, and, the first piston rod and the second piston rod are parallel to each other: or, the damping cylinder is composed of two separate parallel cylinder bodies which are arranged side by side with heads being adjacent to tails, the two cylinder bodies correspond to the first piston rod and the second piston rod respectively, and the first piston rod and the second piston rod are parallel to each other.

In a preferred embodiment, the first coupling member is provided with a cylindrical first wrapping part, a first blind hole is arranged at the center of one end of the first wrapping part, the first blind hole sockets the head of the first piston rod of the damping cylinder, a cylindrical first hinge part is provided at the other end of the first wrapping part, the axes of the first hinge part and the first wrapping part are located in a same plane and perpendicular to each other, and the first hinge part is hinged with a first clamping member of the two clamping members.

In a preferred embodiment, the second coupling member is provided with a cylindrical second wrapping part, a second blind hole is arranged at the center of one end of the second wrapping part, the second blind hole sockets the head of the second piston rod of the damping cylinder, a cylindrical second hinge part is provided at the other end of the second wrapping part, the axes of the second hinge part and the second wrapping part are located in different planes and perpendicular to each other, the second wrapping part and the second hinge part are connected via a turning connecting part, and the second hinge part is hinged with a second clamping member of the two clamping members.

In a preferred embodiment, each clamping member is provided with a sheet-shaped main body, and the clamping member main body is arranged in the guide groove of the connecting plate. A first clamping tooth and a second clamping tooth are arranged at the upper part of the clamping member main body, a clamping mouth is formed between the first clamping tooth and the second clamping tooth, and the clamping mouth extends out of the mounting frame. An inclined guide surface is arranged on the first clamping tooth. A first guide member and a second guide member are arranged at the lower part of the clamping member main body, the first guide member is located above the guide groove, and the second guide member is located below the guide groove, thus enabling the clamping member to slide back and forth along the track formed on the connecting plate. A clamping opening is arranged at the lower part of each clamping member, the clamping opening extends into the lower cavity, the lower cavity accommodates the tension spring, and two ends of the tension spring are respectively connected with the clamping openings of the two clamping members to stretch the tension spring.

In a further solution, the second clamping tooth is formed by bending a strip body, and the tail of the strip body is provided with a tail hook, a notch is formed in the main body at the bottom of the second clamping tooth, a limiting step is arranged at an outer opening of the notch, the tail of the second clamping tooth bends and extends into the notch, and the limiting step allows the tail hook to move only within the notch.

Beneficial Effects of the Present Application

Beneficial Effects

The bidirectional damper of the present application can provide buffering in both positive and negative directions. In the shower door assembly, the bidirectional damper of the present application cooperates with the limiting member on the mounting base to effectively cushion the opening and closing process of small movable door panels, which is beneficial to simplifying the structure of the shower door assembly, where the mounting base may be door frame, guide rail, etc.

In the bidirectional damper of the present application, the damping cylinder, tension spring, coupling members and clamping members are concealed between the first frame plate and the second frame plate, which is conducive to the simplicity of the external structure of the bidirectional damper. Besides, the connecting plate is used to separate the tension spring from the damping cylinder, so as to avoid the tension spring and the damping cylinder from interfering each other, which is conducive to improving the reliability of the bidirectional damper.

In addition, since the guide grooves are in the same plane, the specific arrangement of the first guide member and the second guide member is conducive to the stable movement of the respective clamping member along the corresponding guide groove, and the clamping mouths of the clamping members are on the same plane, so that each clamping member can be installed either on the left or the right, thereby further improving the reliability of the bidirectional damper.

In the present application, the inclined guide surface is arranged on the first clamping tooth, so that when the clamping member reaches the limiting member during the opening and closing of the movable door panel, the limiting member can still force the first clamping tooth to move toward one side of the tension spring or deform under the guidance of the inclined guide surface even if the first clamping tooth interferes with the limiting member, and the first clamping tooth can further pass through the limiting member smoothly, which is conducive to the continuous normal operation of the bidirectional damper.

In the present application, the number of tension springs may be only one, which is conducive to reducing the number of parts of the bidirectional damper and reducing the production difficulty of the bidirectional damper, thereby simplifying the structure of the bidirectional damper and improving the economy.

The second clamping tooth of the present application is of a bent structure, so that even if the clamping member is located at the main body section when reaching the limiting member, the limiting member can still force a first bent section to bend toward one side of the tension spring and deform by extruding the second clamping tooth to deform, and then the second clamping tooth can pass through the limiting member, which ensures that the limiting member can smoothly reach the clamping mouth of the clamping member, and ensures that the clamping member has smoothly returned to the extension section when being separated from the limiting member, and is beneficial to keeping the bidirectional damper running normally for a long time.

Because of the limiting structure, only the first bent section can perform limited deformation and recover from deformation, the limiting structure limits the deformation of a second bent section in the sliding direction, and limits the deformation range of the first bent section by restraining a third bent section from detaching from a limiting cavity, which ensures that the shape of the second clamping tooth is stable and the deformation of the second clamping tooth is controllable.

The connecting plate is abutted with the first guide member and the second guide member to limit the shape of the clamping member in the guide groove, so as to avoid overturning of the clamping member and ensure the stability of the clamping member.

BRIEF DESCRIPTION OF THE DRAWINGS

Description of the Drawings

Figure 1:
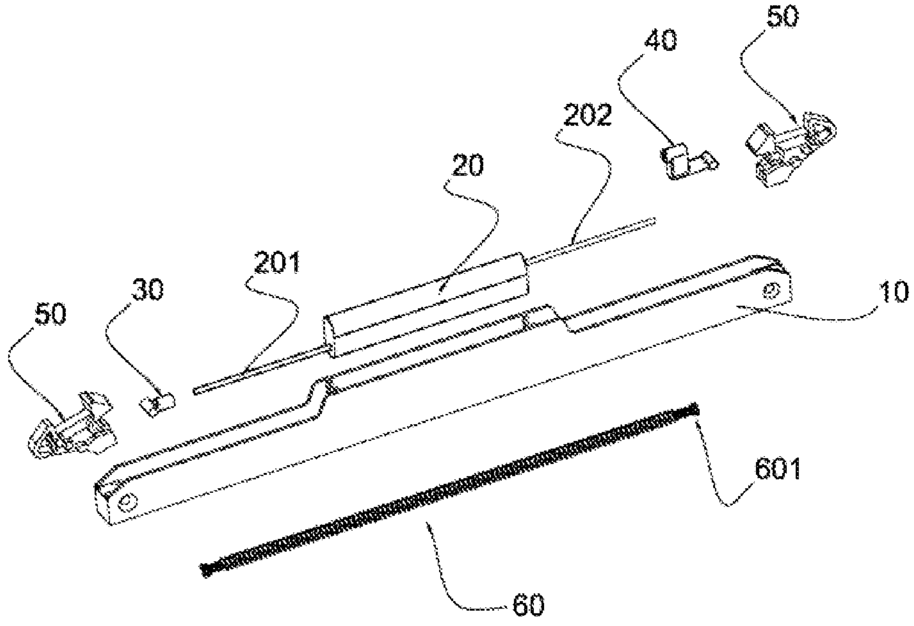

FIG. 1 is a schematic exploded view of an embodiment of a bidirectional damper of the present application.

Figure 2:
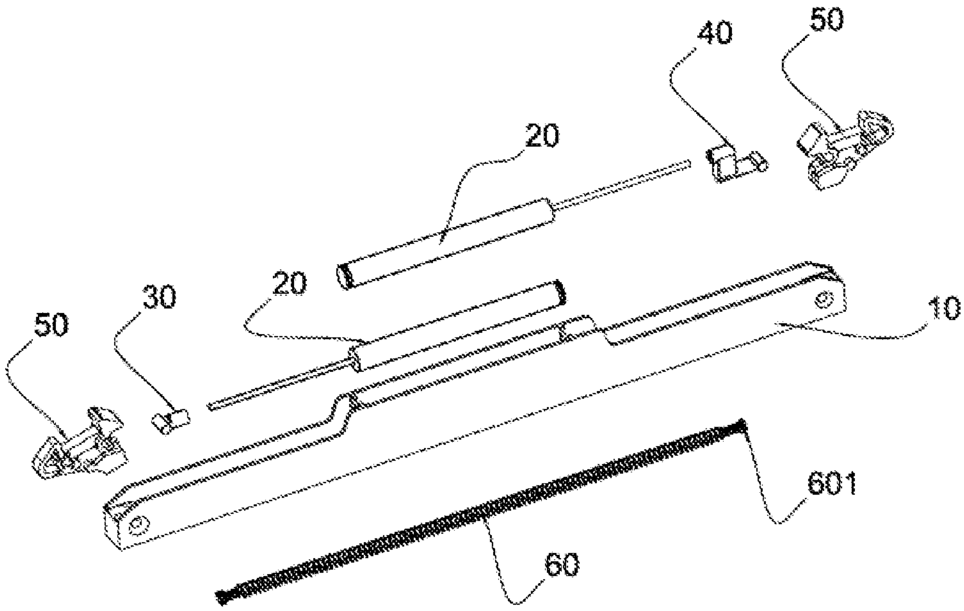

FIG. 2 is a schematic exploded view of an alternative embodiment of the bidirectional damper of the present application.

Figure 3A:
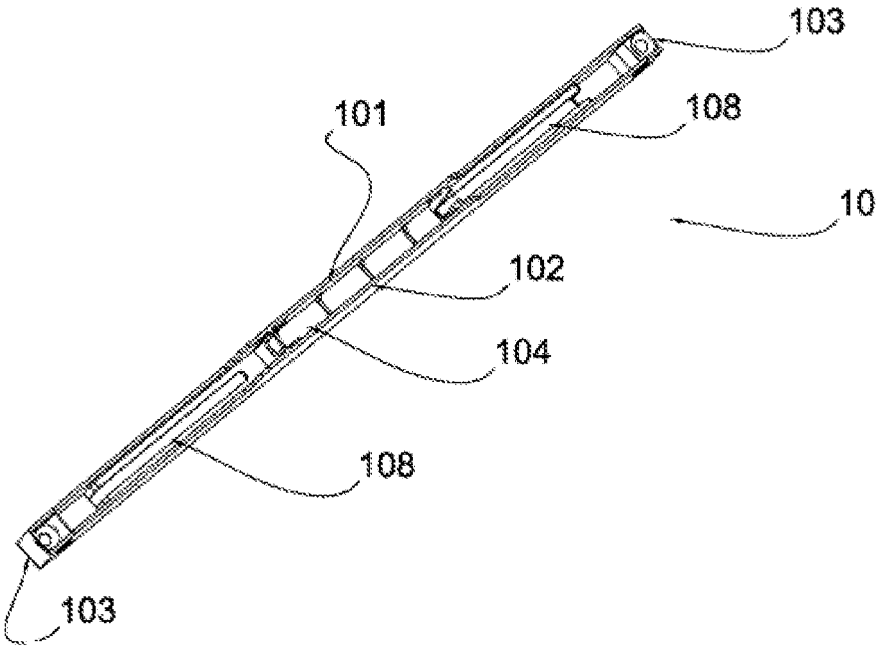
Figure 3B:
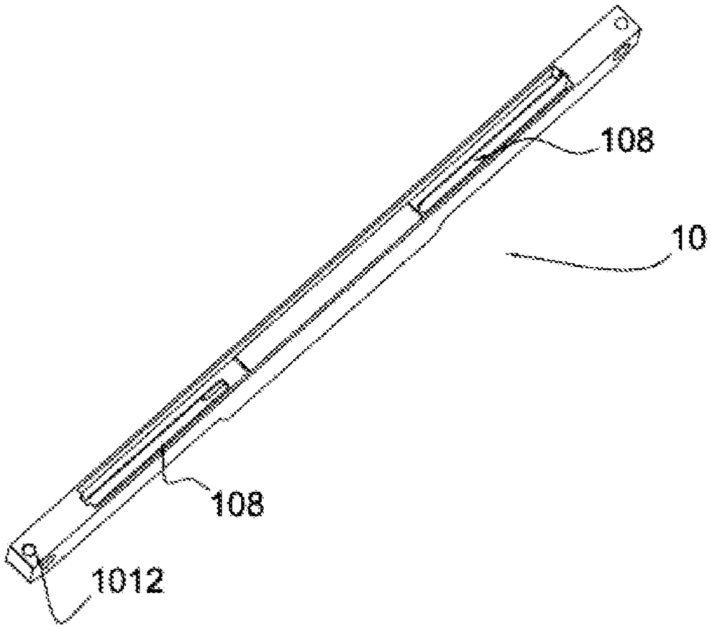
Figure 3C:
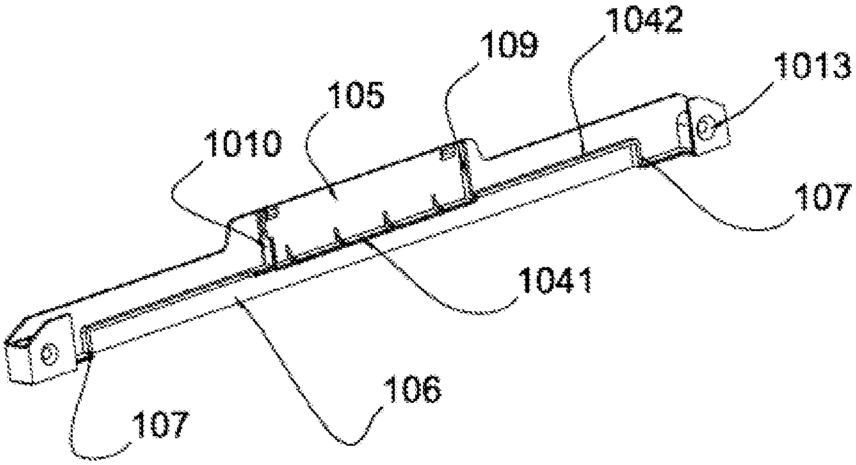

FIG. 3*a* to FIG. 3*c* are schematic views of an outer frame of the bidirectional damper of the present application.

Figure 4A:
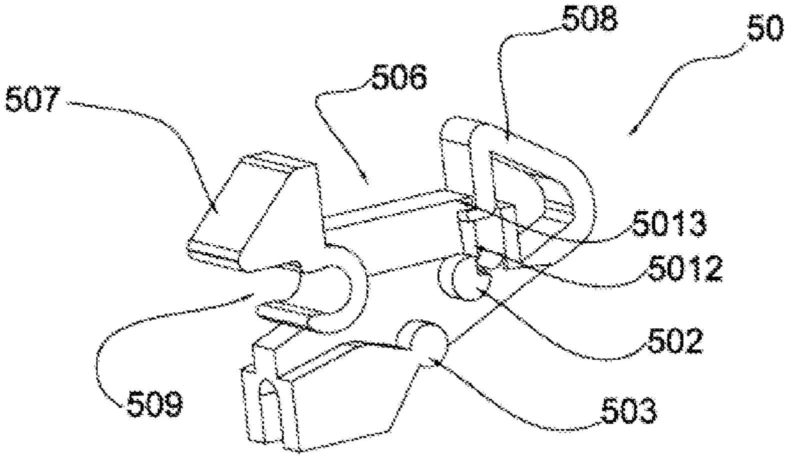
Figure 4B:
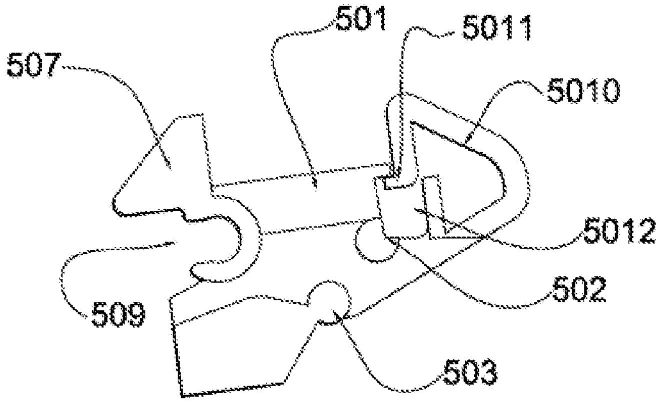
Figure 4C:
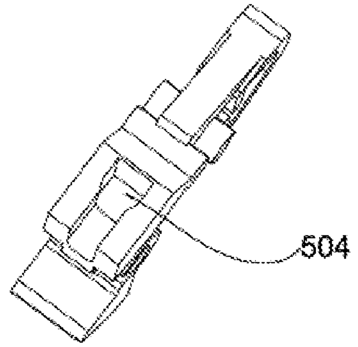

FIG. 4*a* to FIG. 4*c* are schematic views of a clamping member of the bidirectional damper of the present application.

Figure 5A:
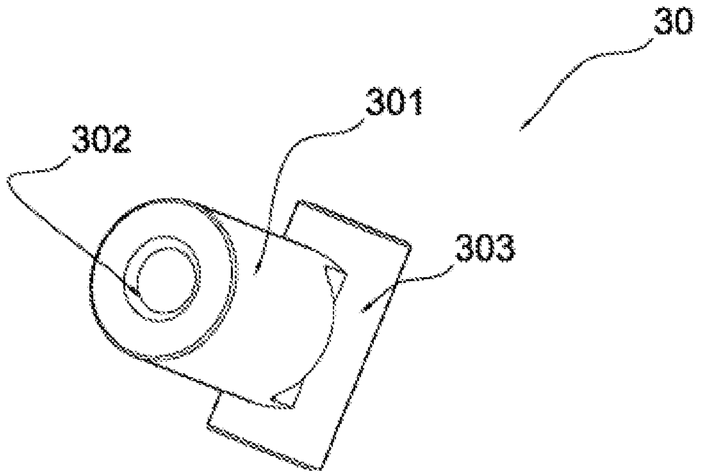
Figure 5B:
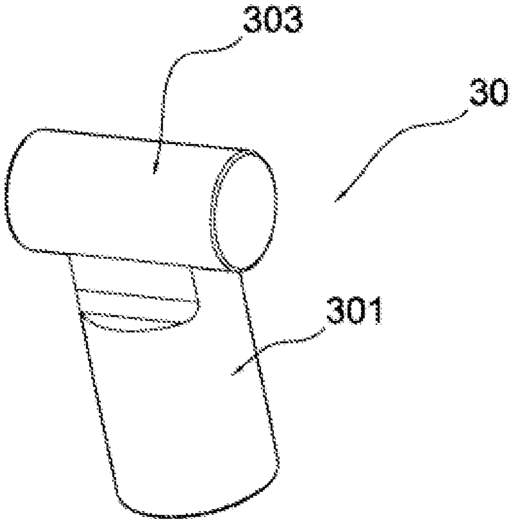

FIG. 5*a* and FIG. 5*b* are schematic views of a first coupling member of the bidirectional damper of the present application.

Figure 6A:
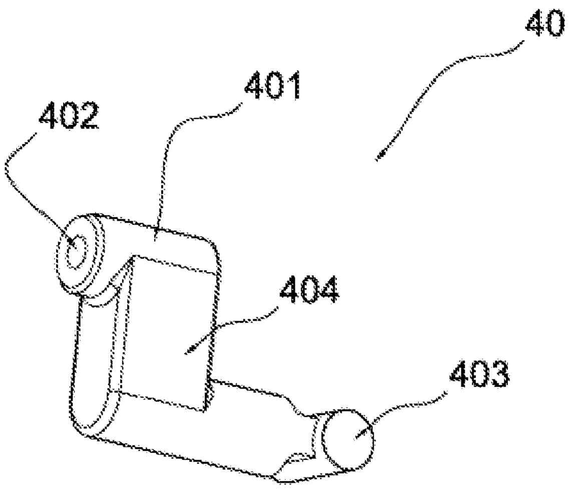
Figure 6B:
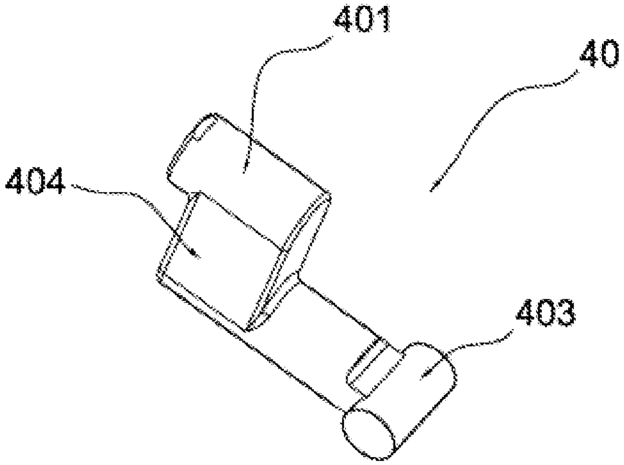

FIG. 6*a* and FIG. 6*b* are schematic views of a second coupling member of the bidirectional damper of the present application.

Figure 7:
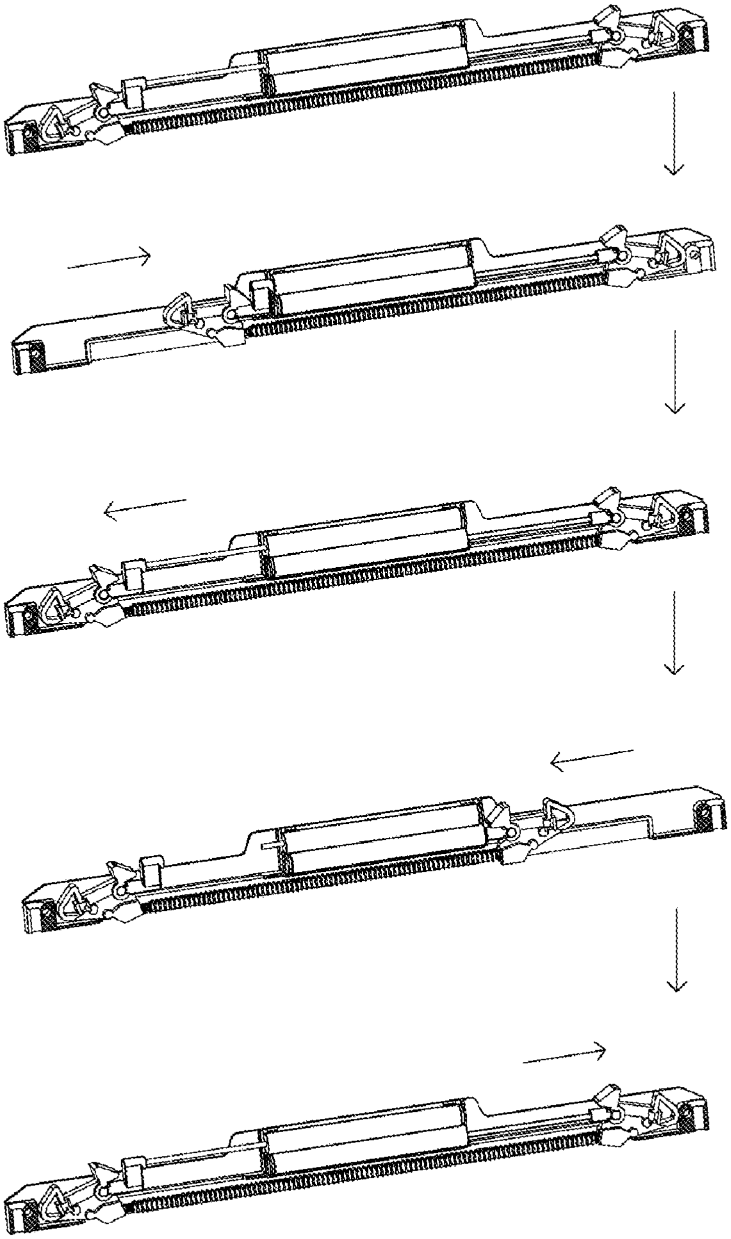

FIG. 7 is a schematic view of the clamping member of the bidirectional damper of the present application running to various positions.

The present application will be further described below with reference to the drawings and embodiments.

EMBODIMENTS

Embodiments of the Present Application

As shown in FIG. 1, an embodiment of a bidirectional damper of the present application includes: a mounting frame 10, a damping cylinder 20, a first coupling member 30, a second coupling member 40, two clamping members 50, and a tension spring 60. When the bidirectional damper is mounted on a shower door for use, the two clamping members 50 respectively correspond to two limiting members arranged on the door frame not shown, and each limiting member is located on the movement path of the corresponding clamping member 50.

As shown in FIG. 3*a* to FIG. 3*c*, the mounting frame 10 includes a first frame plate 101 and a second frame plate 102 with opposite main surfaces, where the first frame plate 101 and the second frame plate 102 are connected by a connecting plate 104 and two fixing blocks 103, the first frame plate 101, the second frame plate 102 and the connecting plate 104 are all strip plate bodies extending along a length direction of the mounting frame 10, the first frame plate 101 and the second frame plate 102 are spaced apart along a width direction of the mounting frame 10 and are parallel to each other, and the two fixing blocks 103 are positioned at two ends of the mounting frame 10 in the length direction. The connecting plate 104 includes a substantially horizontal main body section 1041 and two extension sections 1042, and the two extension sections 1042 are connected to two ends of the main body section 1041 in a length direction thereof.

The first frame plate 101, the second frame plate 102 and the two fixing blocks 103 define a mounting cavity, the connecting plate 104 divides the mounting cavity into an upper cavity 105 and a lower cavity 106, the upper cavity 105 is located above the connecting plate 104, and the lower cavity 106 is located below the connecting plate 104. A cylinder body of the damping cylinder 20 is fixed in the upper cavity 105. As shown in FIG. 1, the cylinder body of the damping cylinder 20 is a dual-cavity cylinder body, and two cylinder cavities of the dual-cavity cylinder body are arranged in parallel, that is, the axes of the two cylinder cavities are parallel to each other, while the openings of the cylinder cavities face toward opposite directions, the two cylinder cavities correspond to a first piston rod 201 and a second piston rod 202 respectively, and, the first piston rod 201 and the second piston rod 202 are parallel to each other. Alternatively, as shown in FIG. 2, the damping cylinder 20 is composed of two separate cylinder bodies which are arranged in parallel with heads being adjacent to tails, the two cylinder bodies correspond to the first piston rod and the second piston rod respectively, and the first piston rod and the second piston rod are parallel to each other.

In an embodiment, the damping cylinder 20 is a gas-liquid damping cylinder, and the damping direction of the damping cylinder is a direction in which the first piston rod 201 and the second piston rod 202 retract into the cylinder cavity, where the retraction directions of the first piston rod 201 and the second piston rod 202 are opposite.

Each fixing block 103 of the mounting frame 10 is provided with mounting holes 1012 and 1013 respectively along the height direction and width direction of the mounting frame 10, so as to fix the mounting frame 10 on the movable door panel with screws.

The connecting plate 104 is provided with two guide grooves 108 extending through the two extension sections 1042 of the connecting plate 104, the two guide grooves 108 extend along the length direction of the mounting frame 10 on the extension sections 1042, the two clamping members 50 are respectively corresponding to the two guide grooves 108, and the respective clamping member 50 is slidably mounted in the corresponding guide groove 108. An outer end of each of the two extension sections 1042 of the connecting plate 104 is bent downwards to form a vertical positioning plate 107, and each guide groove 108 extends from the center of the corresponding vertical positioning plate 107 to the main body section 1041 of the connecting plate 104. A first cover plate 109 and a second cover plate 1010 are respectively provided at two ends of the main body section 1041, the damping cylinder 20 is placed in the space defined by the first cover plate 109 and the second cover plate 1010, and is located in the middle of the upper cavity 105.

As shown in FIG. 4*a* to FIG. 4*c*, each clamping member 50 is provided with a sheet-shaped main body 501, and the clamping member main body 501 is arranged in the guide groove 108 of the connecting plate 104 of the mounting frame 10. A first clamping tooth 507 and a second clamping tooth 508 are arranged at the upper part of the clamping member main body 501, a clamping mouth 506 is formed between the first clamping tooth 507 and the second clamping tooth 508, and the clamping mouth 506 extends out of the mounting frame 10. An inclined guide surface is arranged on the first clamping tooth 507, so that when the clamping member reaches the limiting member during the opening and closing of the movable door panel, the limiting member can still force the first clamping tooth 507 to move toward one side of the tension spring 60 or deform under the guidance of the inclined guide surface even if the first clamping tooth 507 interferes with the limiting member, and the first clamping tooth 507 can further pass through the limiting member smoothly, which is conducive to the continuous normal operation of the bidirectional damper. A first guide member 502 and a second guide member 503 are arranged at the lower part of the clamping member main body 501, the first guide member 502 is located above the guide groove 108, and the second guide member 503 is located below the guide groove 108, thus enabling the clamping member 50 to slide back and forth along the track formed on the connecting plate 104. A clamping opening 504 is arranged at the lower part of each clamping member 50, the clamping opening 504 extends into the lower cavity 106 of the mounting frame 10, the lower cavity 106 accommodates the tension spring 60, and two ends of the tension spring 60 are respectively connected with the clamping openings 504 of the two clamping members 50 to stretch the tension spring. When the clamping member 50 slides on the extension section 1042 of the connecting plate 104, the clamping mouth 506 fixes an external limiting member whose width is less than that of the clamping mouth. When the clamping member 50 slides to the vertical positioning plate 107, under the pull of the tension spring 60 in the lower cavity 106, the clamping member 50 turns, the second clamping tooth 508 sinks and is positioned at the vertical positioning plate 107, and the clamping member 50 loses its limiting effect. When the external limiting member again contacts the first clamping tooth 507 of the clamping member 50 in the reverse direction, the clamping member 50 turns again, the second clamping tooth 508 rises, and the external limiting member is fixed in the clamping mouth 506.

A hinge mouth 509 is formed on one side of the main body 501 of the clamping member 50, which is used to hinge with a first hinge part 303 of the first coupling member 30 or a second hinge part 403 of the second coupling member 40, which will be described below:

The second clamping tooth 508 of the clamping member 50 is formed by bending a strip body 5010, and the tail of the strip body 5010 is provided with a tail hook 5011, a notch 5012 is formed in the main body at the bottom of the second clamping tooth 508, a limiting step S013 is arranged at an outer opening of the notch 5012, the tail of the second clamping tooth 508 bends and extends into the notch 5012, and the limiting step S013 at the notch 5012 allows the tail hook 5011 of the strip body 5010 to move only within the notch 5012. The second clamping tooth 508 can sink elastically, and when the clamping member 50 is in the horizontal position of the mounting frame 10 due to unhooking, the external limiting member can forcibly enter the clamping mouth 506 to restore its function.

As shown in FIG. 1, two ends of the tension spring 60 are each provided with a clamping head 601, which is used to connect with the clamping opening 504 of the clamping member 50.

As shown in FIG. 5*a* and FIG. 5*b*, the first coupling member 30 is provided with a cylindrical first wrapping part 301, a first blind hole 302 is arranged at the center of one end of the first wrapping part 301, the first blind hole 302 covers the head of the first piston rod 201 of the damping cylinder 20, a cylindrical first hinge part 303 is provided at the other end of the first wrapping part 301, the axes of the first hinge part 303 and the first wrapping part 301 are located in a same plane and perpendicular to each other, and the first hinge part 303 is hinged with the hinge mouth 509 of the first clamping member 50.

As shown in FIG. 6*a* and FIG. 6*b*, the second coupling member 40 is provided with a cylindrical second wrapping part 401, a second blind hole 402 is arranged at the center of one end of the second wrapping part 401, the second blind hole 402 covers the head of the second piston rod 202 of the damping cylinder 20, a cylindrical second hinge part 403 is provided at the other end of the second wrapping part 401, the axes of the second hinge part 403 and the second wrapping part 401 are located in different planes and perpendicular to each other, the second wrapping part 401 and the second hinge part 403 are connected via a turning connecting part 404, and the second hinge part 403 is hinged with the hinge mouth 509 of the second clamping member 50.

As shown in FIG. 7, the working principle of the present application is as follows. The bidirectional damper of the present application is mounted on the movable glass of a shower door, a limiting member is respectively arranged at the door opening end and the door closing end of the track, the movable door slides together with the damper, and when the movable door slides toward the door closing end, the limiting member at the door closing end contacts the clamping member at the door closing end, the clamping member turns, and the second clamping tooth rises, so that the clamping mouth formed by the first clamping tooth and the second clamping tooth clamps the limiting member, and the stretched spring in the lower cavity of the mounting frame retracts, pulling the damper and the movable door to continue moving; and the movable door closes slowly under the action of the damping cylinder. While the movable door is opened reversely, since the clamping mouth locks the limiting member, the clamping member is pulled, when the door moves in the opening direction, to move to the end of the damper, and the spring is stretched again, and when the clamping member slides to the vertical positioning plate, under the pull of the spring in the lower cavity, the clamping member turns, the second clamping tooth sinks and is positioned at the vertical positioning plate, and the clamping member loses its limiting effect. The movable door continues to move, and when the limiting member at the door opening end contacts the clamping member at the door opening end, the clamping member turns upward, and the second clamping tooth rises, so that the clamping mouth formed by the first clamping tooth and the second clamping tooth clamps the limiting member, and the stretched spring in the lower cavity of the mounting frame retracts, pulling the damper and the movable door to continue moving, so that the shower door is slowly opened to the maximum position under the action of the damping cylinder. In this way, the impact and noise generated when opening and closing the shower door are effectively reduced.

The above embodiments are only the preferred embodiments of the present application, and more changes can be made to the present application in practical application, as long as the basic object of the present application can be achieved.

INDUSTRIAL APPLICABILITY

The bidirectional damper for a shower door of the present application can be manufactured and applied in industry, so it has industrial applicability.

What is claimed is:

1. A bidirectional damper for a shower door, comprising a mounting frame, a tension spring, a damping cylinder, a first coupling member, a second coupling member and two clamping members; wherein the mounting frame comprises a first frame plate and a second frame plate with opposite main surfaces, wherein the first frame plate and the second frame plate are connected by a connecting plate and two fixing blocks, the first frame plate, the second frame plate and the connecting plate all have strip plate bodies extending along a length direction of the mounting frame, the first frame plate and the second frame plate are spaced apart along a width direction of the mounting frame and are parallel to each other, the two fixing blocks are positioned at two ends of the mounting frame in the length direction, the connecting plate comprises a substantially horizontal main body section and two extension sections, and the two extension sections are connected to two ends of the main body section in a length direction of the main body section;

the first frame plate, the second frame plate and the two fixing blocks define a mounting cavity, the connecting plate is configured to divide the mounting cavity into an upper cavity and a lower cavity, the upper cavity is located above the connecting plate, the lower cavity is located below the connecting plate, and a damping cylinder is fixed in the upper cavity;

the connecting plate is provided with two guide grooves extending through the two extension sections respectively, the two guide grooves extend along the length direction of the mounting frame on the two extension sections, the two clamping members are respectively corresponding to the two guide grooves, and the respective clamping member is slidably mounted in the corresponding guide groove;

an outer end of each of the two extension sections is bent downwards to form a vertical positioning plate, each guide groove extends from a center of the corresponding vertical positioning plate to the main body section, a first cover plate and a second cover plate are respectively provided at two ends of the main body section, the damping cylinder is placed in a space defined by the first cover plate and the second cover plate, and is located in the middle of the upper cavity;

the bidirectional damper is characterized in that, the damping cylinder comprises a cylinder body which is a dual-cavity cylinder body, and two cylinder cavities of the dual-cavity cylinder body are arranged in parallel, axes of the two cylinder cavities are parallel to each other, while openings of the cylinder cavities face toward opposite directions, the two cylinder cavities correspond to a first piston rod and a second piston rod respectively, and, the first piston rod and the second piston rod are parallel to each other; or, the damping cylinder is composed of two separate parallel cylinder bodies which are arranged side by side with heads being adjacent to tails, the two cylinder bodies correspond to the first piston rod and the second piston rod respectively, and the first piston rod and the second piston rod are parallel to each other, wherein the first coupling member is provided with a cylindrical first wrapping part, a first blind hole is arranged at a center of one end of the cylindrical first wrapping part, the first blind hole is configured to socket the head of the first piston rod of the damping cylinder, a cylindrical first hinge part is provided at the other end of the cylindrical first wrapping part, the axes of the cylindrical first hinge part and the cylindrical first wrapping part are located in a same plane and perpendicular to each other, and the cylindrical first hinge part is hinged with a first clamping member of the two clamping members, wherein the second coupling member is provided with a cylindrical second wrapping part, a second blind hole is arranged at a center of one end of the cylindrical second wrapping part, the second blind hole is configured to socket the head of the second piston rod of the damping cylinder, a cylindrical second hinge part is provided at the other end of the cylindrical second wrapping part, the axes of the cylindrical second hinge part and the cylindrical second wrapping part are located in different planes and perpendicular to each other, the cylindrical second wrapping part and the cylindrical second hinge part are connected via a turning connecting part, and the cylindrical second hinge part is hinged with a second clamping member of the two clamping members; and a clamping opening is arranged at a lower part of each clamping member, the clamping opening extends into the lower cavity, the lower cavity accommodates the tension spring, and two ends of the tension spring are respectively connected with the respective clamping openings of the two clamping members to stretch the tension spring.

2. The bidirectional damper according to claim 1, wherein each clamping member has a sheet-shaped clamping member main body, and the clamping member main body is arranged in the corresponding guide groove of the connecting plate; a first clamping tooth and a second clamping tooth are arranged at an upper part of the clamping member main body, a clamping mouth is formed between the first clamping tooth and the second clamping tooth, and the clamping mouth extends out of the mounting frame; an inclined guide surface is arranged on the first clamping tooth; a first guide member and a second guide member are arranged at a lower part of the clamping member main body, the first guide member is located above the guide groove, and the second guide member is located below the guide groove, so that each clamping member slides back and forth along a track formed on the connecting plate.

3. The bidirectional damper according to claim 2, wherein the second clamping tooth is formed by bending a strip body, and the tail of the strip body is provided with a tail hook, a notch is formed in the main body at the bottom of the second clamping tooth, a limiting step is arranged at an outer opening of the notch, the tail of the second clamping tooth bends and extends into the notch, and the limiting step allows the tail hook to move only within the notch.

* * * * *